United States Patent
Hingorani et al.

(10) Patent No.: US 12,405,023 B2
(45) Date of Patent: Sep. 2, 2025

(54) HVAC SYSTEM WITH INDOOR AIR QUALITY MONITORING AND MITIGATION

(71) Applicant: Lennox Industries Inc., Richardson, TX (US)

(72) Inventors: Sanjeev Hingorani, Gainesville, FL (US); Henry Greist, Gainesville, FL (US); Elena Smirnova, Plano, TX (US); Pete Hrejsa, Frisco, TX (US); Emile Abi-Habib, Irving, TX (US); Dhishan Kande, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 640 days.

(21) Appl. No.: 17/741,968

(22) Filed: May 11, 2022

(65) Prior Publication Data

US 2023/0366581 A1 Nov. 16, 2023

(51) Int. Cl.
| | |
|---|---|
| *F24F 11/74* | (2018.01) |
| *F24F 11/00* | (2018.01) |
| *F24F 11/63* | (2018.01) |
| *F24F 110/66* | (2018.01) |
| *F24F 110/70* | (2018.01) |

(52) U.S. Cl.
CPC .......... *F24F 11/74* (2018.01); *F24F 11/0001* (2013.01); *F24F 11/63* (2018.01); *F24F 2110/66* (2018.01); *F24F 2110/70* (2018.01)

(58) Field of Classification Search
CPC ........ F24F 11/74; F24F 11/63; F24F 11/0001; F24F 2110/70; F24F 2110/66
USPC .......................................................... 454/229
See application file for complete search history.

(56) References Cited

U.S. PATENT DOCUMENTS

| | | | | |
|---|---|---|---|---|
| 7,434,413 | B2* | 10/2008 | Wruck | F24F 11/62 |
| | | | | 165/251 |
| 10,458,668 | B2* | 10/2019 | Emmons | F24F 11/30 |
| 10,808,955 | B2* | 10/2020 | Tripathii | F24F 11/56 |
| 10,900,682 | B2* | 1/2021 | Dean-Hendricks | G05B 15/02 |
| 11,137,163 | B2* | 10/2021 | Nasis | F24F 11/89 |
| 11,268,725 | B2* | 3/2022 | Chen | F24F 8/10 |
| 2018/0299159 | A1* | 10/2018 | Ajax | F24F 11/46 |
| 2021/0164683 | A1* | 6/2021 | Walton | F24F 11/83 |
| 2023/0011991 | A1* | 1/2023 | Xu | F24F 11/74 |
| 2023/0243542 | A1* | 8/2023 | Chakraborty | F24F 11/65 |
| | | | | 454/229 |

\* cited by examiner

*Primary Examiner* — Avinash A Savani
*Assistant Examiner* — Dana K Tighe
(74) *Attorney, Agent, or Firm* — Baker Botts L.L.P.

(57) ABSTRACT

An HVAC system includes one or more air quality sensors, each configured to measure an air quality and a thermostat communicatively coupled to the one or more air quality sensors. The thermostat receives indoor air quality measurements from the one or more air quality sensors. An indoor air quality score is determined based at least in part on the received indoor air quality measurements. The thermostat determines, based at least in part on the indoor air quality score, a mitigation action, wherein the mitigation action comprises one or more actions selected from the group of: (i) a filtering action comprising filtering air provided to the space using an air purification subsystem, and (ii) a ventilation action comprising ventilating the space using a ventilation subsystem. The mitigation action is executed, or implemented, by adjusting one or more components of the HVAC system.

17 Claims, 6 Drawing Sheets

HVAC SYSTEM WITH INDOOR AIR QUALITY MONITORING AND MITIGATION

TECHNICAL FIELD

This disclosure relates generally to heating, ventilation, and air conditioning (HVAC) systems. More particularly, in certain embodiments, this disclosure relates to an HVAC system with indoor air quality monitoring and mitigation.

BACKGROUND

Heating, ventilation, and air conditioning (HVAC) systems are used to regulate temperature within an enclosed space. Air is cooled via heat transfer with refrigerant flowing through the HVAC system and returned to the enclosed space as conditioned air.

SUMMARY OF THE DISCLOSURE

HVAC systems generally provide cooled or heated air to a space to improve comfort of occupants of the space. This disclosure recognizes that other qualities of air in the conditioned space can also be monitored, and that intelligent actions can be taken to improve indoor air quality. To achieve this and other improvements over previous technology, this disclosure provides an intelligent thermostat that receives information about indoor air quality and uses this information to provide efficient and reliable remediation of any air qualities that are outside a desired range. Mitigation actions are selected based on real-time indoor and/or outdoor air quality metrics, recent trends of individual contaminant levels, and/or previous air cleaning attempts, such that the most efficient and effective mitigations are executed to improve the air quality in a space. Altogether the improved thermostat facilitates an automated approach to maintaining air quality at desired levels, while reporting air quality information to the users via real-time visual indicators and with retrospective/historical data. For example, trends in attempted mitigations and associated air quality can be used to identify system failures or flag unhealthy air quality exposures. Certain embodiments may include none, some, or all of the above technical advantages. One or more other technical advantages may be readily apparent to one skilled in the art from the figures, descriptions, and claims included herein.

In an embodiment, an HVAC system includes one or more air quality sensors, each configured to measure an air quality and a thermostat communicatively coupled to the one or more air quality sensors. The thermostat receives indoor air quality measurements from the one or more air quality sensors. An indoor air quality score is determined based at least in part on the received indoor air quality measurements. The thermostat determines, based at least in part on the indoor air quality score, a mitigation action, wherein the mitigation action comprises one or more actions selected from the group of: (i) a filtering action comprising filtering air provided to the space using an air purification subsystem, and (ii) a ventilation action comprising ventilating the space using a ventilation subsystem. The mitigation action is executed, or implemented, by adjusting one or more components of the HVAC system.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5B of the drawings, like numerals being used for like and corresponding parts of the various drawings.

As described above, prior to the present disclosure, there was a lack of tools for efficiently and automatically monitoring air quality and mitigating any detected air quality issues. This disclosure provides technical solutions to these and other problems by providing an intelligent thermostat or HVAC system controller that monitors indoor air quality (e.g., via sensor measurements), determines indoor air quality scores for various quality types (or corresponding contaminants such as particulate matter, volatile organic compounds, carbon dioxide, and the like), determines a mitigation action for improving any air quality scores below a threshold, and automatically executes the mitigation action. The indoor air quality continues to be monitored after and/or while the mitigation action is performed, and the mitigation action may be repeated, paused, stopped, or changed depending on how the indoor air quality is impacted by attempted mitigation actions. In some cases, the mitigation action is performed in cycles, and a reassessment is performed to determine if the same mitigation action should be repeated, mitigation should be stopped, or a different mitigation action should be performed (see, e.g., FIGS. 4, 5A and 5B).

HVAC System

Figure 1:
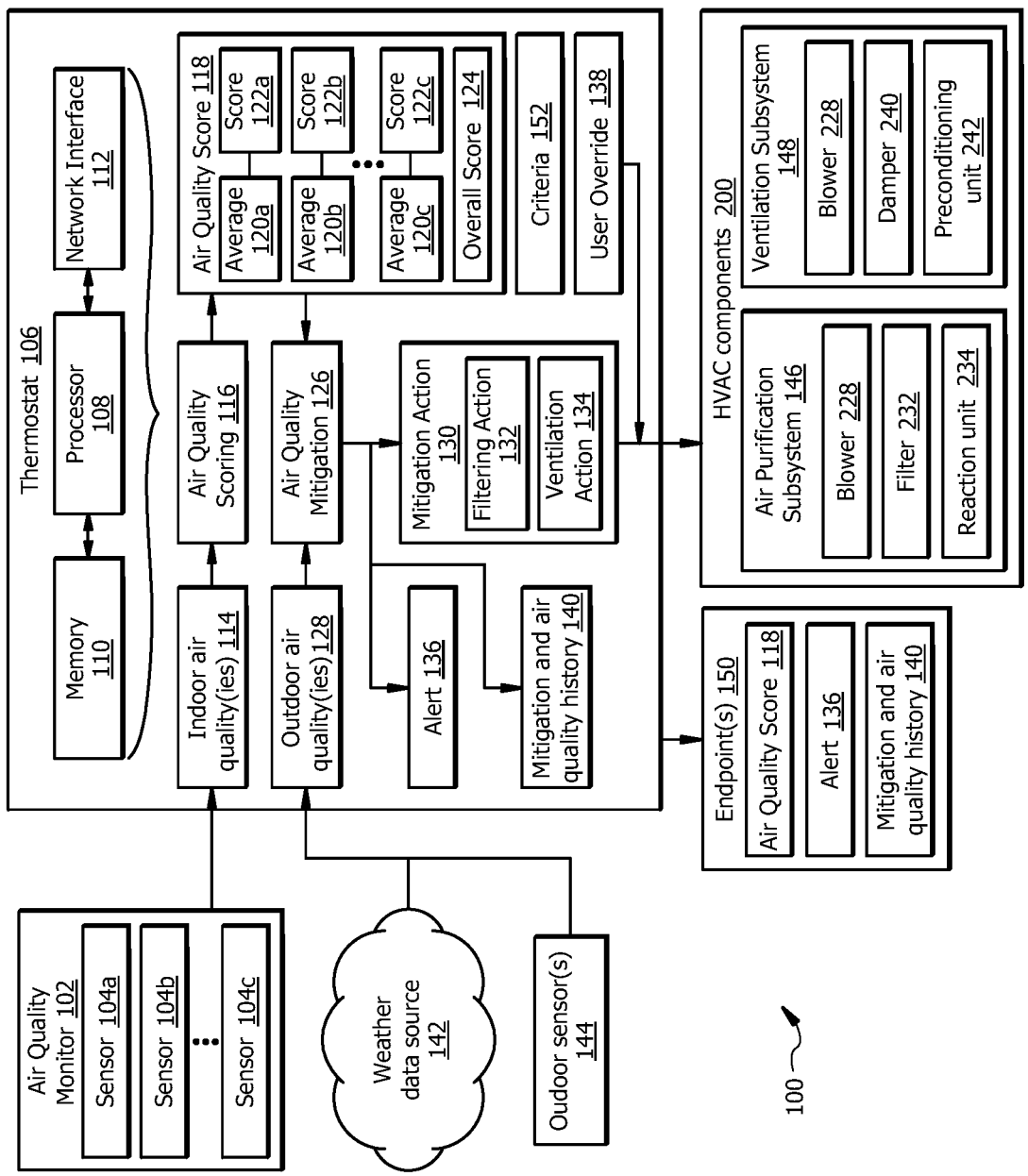
FIG. 1 is a block diagram of an example HVAC system configured for improved indoor air quality monitoring and mitigation.

FIG. 1 shows a block diagram of an example HVAC system 100 that includes at least one air quality monitor 102, a thermostat 106 configured for air quality monitoring and mitigation, HVAC components 200 (see FIG. 2) operable to provide conditioned air to a space and execute mitigation actions 130 determined by the thermostat 106, and endpoints 150 capable of presenting information determined by the thermostat 106. The HVAC system 100 is generally configured to deliver conditioned air to a space, as illustrated in greater detail with respect to FIG. 2, described below, which shows other HVAC components 200 in greater detail.

Air Quality Data Sources—Air Quality Monitor, Weather Data Source, and Outdoor Sensor(s)

The air quality monitor 102 may include one or more air quality sensors 104a-c. The example of FIG. 1 shows three air quality sensors 104a-c. However, this disclosure contemplates the HVAC system 100 including any number of air quality sensors 104a-c. Each air quality sensor 104a-c measures a property of the indoor air in the space serviced by the HVAC system 100. For instance, a first air quality sensor 104a may be a particle sensors that measures a particle concentration in the space. Examples of such sensors are particulate matter (PM) sensors that measure particle concentrations for different particle sizes (e.g., values of PM1.0, PM2.5, and the like). As another example, a second air quality sensor 104b may be a gas sensors that measures total volatile organic compounds (TVOCs or simply VOCs) in the indoor space. TVOC is a measure of the level, or concentration, of total measurable organic compounds in the air. As yet another example, a third air quality sensor may be a gas sensor that measures carbon dioxide ($CO_2$) in the indoor space. As further non-limiting examples, air quality sensors 104a-c may be other sensors to measure any component that may be found in air and considered a contaminant, such as carbon monoxide, ozone, radioactivity, radon, formaldehydes, nitrogen oxides, and the like.

Figure 2:
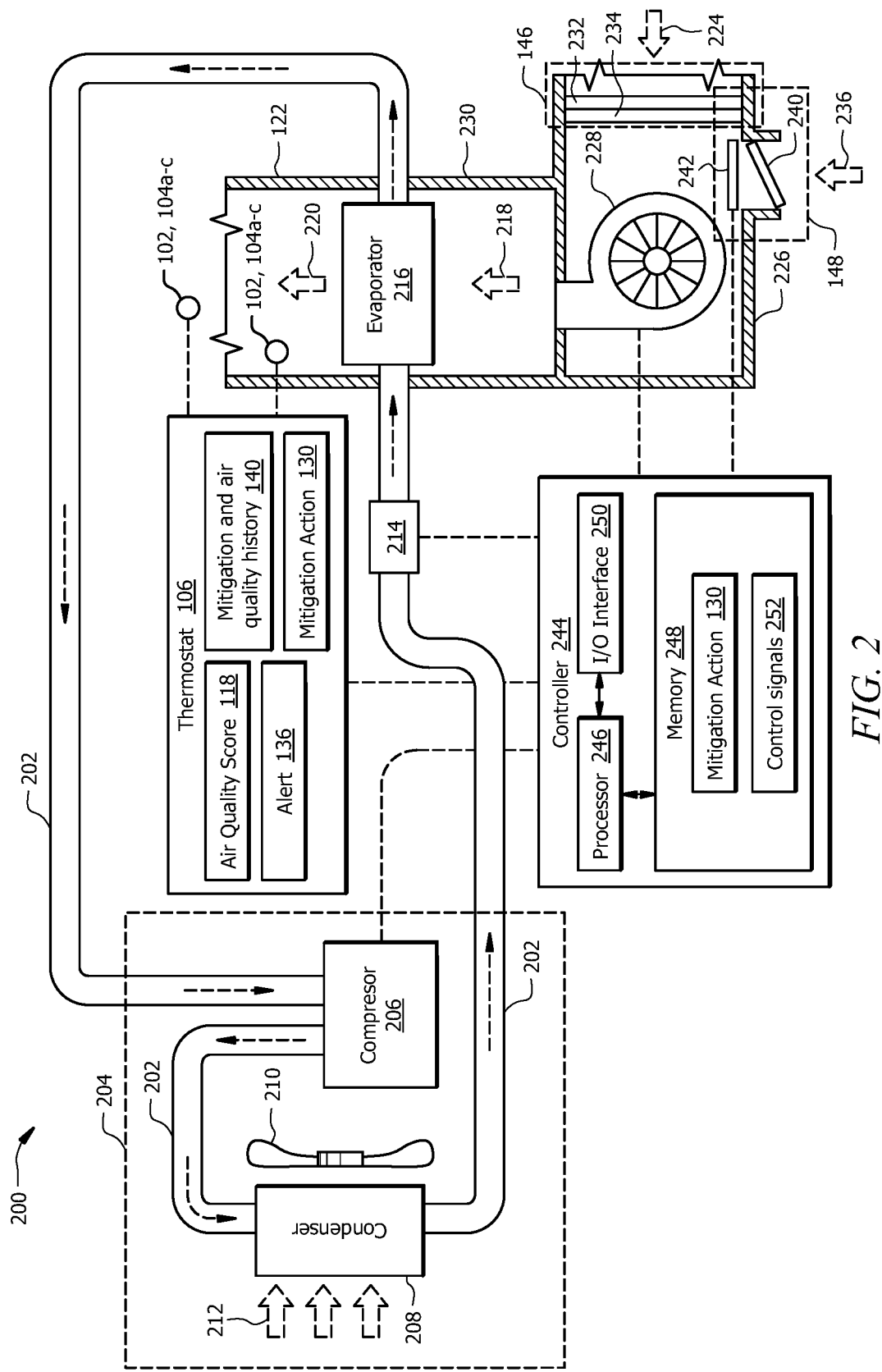
FIG. 2 is a diagram illustrating the HVAC components of the system of FIG. 1 in more detail.

In some cases, a sensor 104a-c may be located within a duct of the HVAC system 100, as shown in the example of FIG. 2 in which a sensor 104a-c is located within duct 222. In such cases, measurements of indoor air quality 114 may only be obtained while the blower 228 is running to provide a flow of air through the duct (e.g., airflow 220 of FIG. 2). Measurements of indoor air quality 114 may not be provided to the thermostat 106 when the blower 228 is not running or has not run for a sufficiently long period of time. If a measurement of indoor air quality 114 is needed but the blower 228 is not running, the thermostat 106 may temporarily cause the blower 228 to turn on or run so that a measurement of indoor air quality 114 can be obtained from an in-duct sensor 104a-c. For example, the thermostat 106 (described in greater detail below) may wait until a minimum air flow (see CFMm of TABLE 1 below) is established before using air qualities 114 measured from an in-duct sensor 104a-c. The thermostat 106 may also or alternatively wait until the blower 228 has operated for a minimum runtime (see Tw of TABLE 1 below) before using air qualities 114 measured from an in-duct sensor 104a-c and/or delay collection of air qualities 114 until the blower 228 has operated for a minimum ramp-up time (see Tr of TABLE 1 below). The thermostat 106 may operate according to a maximum time interval (see Tm of TABLE 1 below) between receiving measures of air qualities 114 from an in-duct sensor 104a-c. If a measurement of an air quality 114 is not received within that interval, the blower 228 is powered on to take in-duct measurement of the air quality 114.

As described further below, in some cases, outdoor air qualities 128 may be used to help determine an appropriate mitigation action 130 for improving indoor air qualities 114. In some cases, outdoor air properties 128 may be provided by or determined from information provided by a weather data source 142. For example, a weather data source 142 may provide an indication of an outdoor air quality 128 in the form of an outdoor air quality index. In some cases, one or more outdoor sensors 144 may be used to determined outdoor air qualities. The outdoor sensors 144 may be the same as or similar to sensors 104a-c described above.

Thermostat

The thermostat 106 is in communication (e.g., via wireless and/or wired communication) with the air quality monitor 102 to receive indoor air qualities 114 and with HVAC components 200 to implement or execute a mitigation action 130 to remediate any detected air quality issues. Turning briefly to FIG. 2, the thermostat 106 may be in communication with a controller 244 of the HVAC system 100. In some embodiments, all or a portion of the operations of the controller 244 may be performed by the thermostat 106. Referring to both FIGS. 1 and 2, the thermostat 106 receives measurements of indoor air quality 114 from the one or more air quality sensors 104a-c. The air qualities 114 may, for example, be the concentrations of different contaminants that are detected by the air quality sensors 104a-c (e.g., PM, TVOC, $CO_2$, and/or the like).

The thermostat 106 includes a processor 108, memory 110, and network interface 112. The processor 108 includes one or more processors. The processor 108 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 110 and network interface 112. The one or more processors are configured to process data and may be implemented in hardware and/or software. For example, the processor 108 may be 8-bit, 16-bit, 32-bit, 64-bit or of any other suitable architecture.

The memory 110 is operable to store any data, instructions, logic, rules, or code operable to execute the functions of the thermostat 106, including, but not limited to, the items illustrated in FIG. 1. The memory 110 includes one or more disks, tape drives, or solid-state drives, and may be used as an over-flow data storage device, to store programs when such programs are selected for execution, and to store instructions and data that are read during program execution. The memory 110 may be volatile or non-volatile and may comprise read-only memory (ROM), random-access memory (RAM), ternary content-addressable memory (TCAM), dynamic random-access memory (DRAM), and static random-access memory (SRAM).

The network interface 112 is configured to enable wired and/or wireless communications. The network interface 112 is configured to communicate data between the thermostat 106 and other network devices, systems, or domain(s), such as the air quality monitor 102, weather data source 142, outdoor sensor(s) 144, HVAC components 200, and endpoints 150. The network interface 112 is an electronic circuit that is configured to enable communications between devices. For example, the network interface 112 may include one or more serial ports (e.g., USB ports or the like) and/or parallel ports (e.g., any type of multi-pin port) for facilitating this communication. As a further example, the network interface 112 may include a WIFI interface, a local area network (LAN) interface, a wide area network (WAN) interface, a modem, a switch, or a router. The processor 108 is configured to send and receive data using the network interface 112. The network interface 112 may be configured to use any suitable type of communication protocol.

Air Quality Scoring

Referring again to FIG. 1, the thermostat 106 receives indoor air qualities 114 (e.g., levels of PM, TVOC, $CO_2$, and/or the like) from the air quality monitor 102. The sensors 104a-c of the air quality monitor 102 may measure air qualities 114 at a predefined rate (see IAQSamplingRate of TABLE 1 below). Measurements of air qualities 114 from the sensors 104a-c may be transmitted at a predefined frequency (see Tt of TABLE 1 below). The thermostat 106 may define a maximum interruption time (see Ti of TABLE 1 below) after which measurements of air qualities 114 are deemed unavailable if not received from sensors 104a-c.

After receiving measurements of air qualities 114, the thermostat 106 performs air quality scoring 116 to determine an air quality score 118 based on the indoor air qualities 114. For example, the thermostat 106 may determine an average value 120a-c for each indoor air quality 114 that is measured. The average value 120a-c may be a moving average of sensor measurements of the air qualities 114 over a period of time. Averaging may, for example, remove or decrease the influence of erratic sensor readings. Each average value 120a-c is converted to a corresponding score 122a-c (e.g., of good, fair, or poor). For example, each average value 120a-c may be compared to a corresponding threshold value (see, e.g., Good_X and Poor_X of TABLE 1 below, where X identifies the contaminant) for the air quality based on adjustable or predefined thresholds for each contaminant or corresponding air quality 114. An overall score 124 may be determined, such that a concise, single indication may be reported (e.g., via an endpoint device 150) to communicate air quality to occupants of the space or others. For example, the overall score 124 may be reported to endpoint devices 150 that are a user-interface of the thermostat 106, a building automation system, a building log system, or the like. The overall score 124 may be the lowest of the scores 122a-c. Individual scores 122a-c may similarly be available for review via an endpoint device 150. If any air qualities 114 (e.g., from one or more of the sensors 104a-c) are not available for any reason, the thermostat 106 proceeds with air quality scoring 116 using the available measurements of air qualities 114.

Example parameters and example values of these parameters that may be used to tune air quality scoring 116 are shown in TABLE 1 below. These parameters may be adjusted, for example, based on field trial performance or initial installation feedback to improve the usefulness of air quality scoring 116 for initiating automatic mitigations, as described further below. As a non-limiting example, the following three parameters may be used to determine a score 122a-c for each contaminant or air quality 114: (1) Good_X is an upper boundary for acceptable levels of contaminants, (2) Poor_X is a lower boundary for poor levels of contaminants, and (3) Scale_X is used to adjust to baseline levels of each contaminant for a given site or location. X represents each contaminant or air quality 114 measured by sensors 104a-c. For example, X may represent a concentration of PM, a concentration of TVOC, a concentration of $CO_2$, or the like. Scale_X may provide unique benefits because expected baseline values of air qualities 114 may be different based on environmental factors (e.g., proximity to dust-producing processes and/or expected exposure to certain contaminants. For instance, in various locations and indoor spaces, the baseline levels of contaminants may vary, such that a general default Good_X value may not provide the best representative value beyond which sub-optimal air quality should be reported and a mitigation action 130 should be triggered.

TABLE 1

Example parameters for scoring indoor air quality

| Parameter | Purpose | Units | Min | Max | Default |
|---|---|---|---|---|---|
| IAQSamplingRate | Sensor data sampling rate | 1/min | 1 | 60 | 2 |
| Tt | Air quality monitor transmission frequency | 1/min | 1 | 5 | 1 |
| Ti | max data interruption time after which data are deemed as unavailable | min | 3 | 10 | 5 |
| Tsa | time span over which sensor measurements are aggregated for the short-term averages | min | 1 | 30 | 5 |
| Tla | time span over which sensor measurements are aggregated for the long-term averages | day | 1 | 30 | 7 |
| Tm | max time interval between polling data from in-duct sensors | min | 3 | 45 | 15 |
| CFMm | min airflow required for sensor reading for in-duct sensors | CFM | CFM min | CFM max | CFM min |
| Tw | min blower runtime to gather data from in-duct sensors | min | Tsa | Tsa × 2 | Tsa + 1 |
| Tr | delay before collecting measurements to allow for blower ramp-up | sec | 0 | 60 | 30 |
| Good_PM2.5 | good PM2.5 level upper boundary | $\mu g/m^3$ | 0 | 15 | 12 |
| Poor_PM2.5 | poor PM2.5 level lower boundary | $\mu g/m^3$ | 36 | 100 | 36 |
| Good_CO2 | good $CO_2$ level upper boundary | ppm | 400 | 1000 | 800 |
| Poor_CO2 | poor $CO_2$ level lower boundary | ppm | 2000 | 7000 | 2000 |
| Good_VOC | good VOC level upper boundary | ppb | 0 | 500 | 220 |
| Poor_VOC | poor VOC level lower boundary | ppb | 660 | 2200 | 1000 |
| Scale_PM2.5 | PM2.5 boundary good level scaling factor | # | 0.5 | 3 | 1 |
| Scale_VOC | VOC boundary scaling factor | # | 0.5 | 3 | 1 |
| Scale_C02 | $CO_2$ boundary scaling factor | # | 0.5 | 3 | 1 |

To achieve reliable scaling of Good_X and Poor_X, Scale_X values are selected to adjust for these location-based considerations. For example, a technician installing the HVAC system 100 in a given location may adjust values of ScaleX for each contaminant or air quality 114. For instance, in a location with relatively clean air in terms of volatile organic compounds (Air Cleanness Level of "High"), Scale_X values for air qualities 114 corresponding to particulate matter (scale_PM), TVOC (scale_VOC), and carbon dioxide (scale-CO2) may be set to scale_PM=1, scale_VOC=1, and scale_CO2=1, respectively. In a location with moderately clean air in terms of volatile organic compounds and particulate matter (Air Cleanness Level of "Moderate"), Scale_X values may be set to scale_PM=1.1, scale_VOC=1.59, and scale_CO2=1. In a location with relatively poor air quality (Air Cleanness Level of "Basic"), Scale_X values may be set to scale_PM=1.3, scale_VOC=2.25, and scale_CO2=1. Example values of Good_X, Poor_X, and Scale_X for different example air qualities 114 or corresponding contaminants are illustrated in TABLE 1 above.

Scores 122a-c may be determined based on averages 120a-c. Averages 120a-c may be short-term average (STAs) of the different air qualities 114. The averages 120a-c may be a moving average of all data points collected during a minimum time period (see, e.g., Tsa of TABLE 1 above). To determine the score 122a-c from each STA corresponding to averages 120a-c, each average 120a-c may be compared to a scaled threshold value. For instance, the score 122a-c for a given air quality may be "Good" the average 120a-c for that air quality 114 (STA_x) is less than or equal to the product of Scale_x×Good_x. A "Fair" score 122a-c may be determined if Scale_x×Good_x<STA_x<Scale_x×Poor_x. A "Poor" score 122a-c may be determined if STA_x≥Scale_x×Poor_x. A score 122a-c of "unavailable" if STA_x=NaN (not a number), for example, because of a sensor reading error or other error. The overall score 124 is determined to summarize the individual scores 122a-c for the measured air qualities 114. As an example, an overall score 124 of "Good" may be determined if all of the individual scores 122a-c are "Good". The overall score 124 may be "Poor" if any of the individual scores 122a-c is "Poor". Otherwise, the overall score 124 may be "Fair". In some cases, one or more of the averages 120a-c may be a long-term average (LTA_x) of an indoor air quality 114. Long-term averages may be determined similarly to STAs but over a longer period of time (e.g., as defined by Tla of TABLE 1 above).

Air Quality Mitigation

The thermostat 106 then uses the air quality score 118 to perform air quality mitigation 126 by determining and executing a mitigation action 130. The mitigation action 130 may include a filtering action 132, which involves filtering air that is provided to the space by the HVAC system 100 using an air purification subsystem 146, and/or a ventilation action 134, which involves ventilating the space using a ventilation subsystem 148, as described in greater detail below. In some cases, the mitigation action 130 is determined at least in part using one or more outdoor air qualities 128. For example, a ventilation action 134 may be prevented if the outdoor air quality 128 is poor. TABLE 2 summarizes when a filtering action 132 and a ventilation action 134 may be determined and performed.

fication subsystem 146 available, type of ventilation subsystem 148 available, or the like); (iii) trends of the active contaminant over previous mitigation attempts or cycles (e.g., whether contaminant levels are increasing, decreasing, or stable); (iv) the number of preceding mitigation attempts (e.g., whether a maximum number of mitigation cycles has been reached), (v) the outdoor air quality 128 (e.g., whether the outdoor air quality 128 is sufficiently good to allow a ventilation action 134); and (vi) a user preference, for example, provided through a user override 138 that may pause, stop, prevent, or postpone a mitigation action 130. The mitigation action 130 is executed by operating HVAC components 200. Example HVAC components 200 that may be operated to perform the mitigation action 130 include an air purification subsystem 146 for implementing a filtering action 132 and a ventilation subsystem 148 for implementing a ventilation action 134. Further details of the HVAC components 200 are described below with respect to FIG. 2.

As a further example, the thermostat 106 may determine that the mitigation action 130 is the filtering action 132 by determining that criteria 152 are satisfied that are associated with one or more of a current indoor air quality 114 (e.g., a current score 122a-c for the quality 114), a number of previous attempts to perform the filtering action 132, and a trend in the indoor air quality 114 over time. For example, if the scores 122a-c indicate air quality score 118 is poor and a maximum number of attempts of the filtering action 132 have not recently been performed, the thermostat 106 may determine to perform a filtering action 132. The filtering action 132 may be executed by performing a filtration cycle using the air purification subsystem 146. For example, the thermostat 106 may turn on blower 228 to provide a flow of

TABLE 2

Summary of filtering actions 132 and ventilation actions 134.

|  | Filtering Action | Ventilation Action |
|---|---|---|
| Primary mitigation measure for removing: | 1. PM<br>2. TVOC if the air purification subsystem 146 includes reactor unit 234. | 3. $CO_2$,<br>4. TVOC in the absence of a reactor unit 234. |
| Achieved by: | air circulation with blower 228 through air filter(s) 232. | operating the ventilation subsystem 146 to ventilate the space. |
| Is allowed to run continuously? | Yes. E.g., mitigation may run continuously in cases of persistent PM contamination. | No. E.g., mitigation may stop after a predefined number of back-to-back cleaning cycles, but might be re-attempted in case of persistent $CO_2$/TVOC events after a preset timeout. |

An example process for determining a mitigation action 130 is described briefly here. Further examples of mitigation action 130 determination and execution are described below with respect to the examples of FIGS. 3, 4, 5A, and 5B. To determine a mitigation action 130, the air quality score 118 may be determined every period of time (e.g., each minute) based on measurements of air qualities 114, as described above. If the score 122a-c for a given air quality 114 or corresponding contaminant is below a threshold (e.g., below a score 122a-c of "Good"), that air quality 114 is selected as an active contaminant for mitigation. The mitigation action 130 is determined based on one or more of the following factors: (i) the type of air quality 114 or contaminant (e.g., PM, TVOC, $CO_2$) needing mitigation; (ii) the available components for providing mitigation (e.g., type of air puriindoor air through the filter 232 and/or reactor unit 234 (see FIG. 2 and corresponding description below for further details).

In some embodiments, after completion of the filtering action 132 for a period of time or a predefined number of cycles, the thermostat 106 may reassess whether a continued mitigation is needed or whether the same or a different mitigation action 130 should be performed. If the indoor air qualities 114 received after the cycles of filtering action 132 are complete satisfy criteria 152 (e.g., indicating the filtering action 132 is not successful) associated with one or more of a type of contaminant needing to be removed, a number of previous attempts to perform the filtering action 132, and a trend in the indoor air quality 114 over time, the filtering action 132 may be paused. The thermostat 106 determines whether a ventilation action 134 is allowed. For example, the thermostat 106 may determine that the ventilation action 134 is allowed by determining whether criteria 152 are satisfied associated with one or more of an outdoor air quality 128, a number of previous attempts to perform the ventilation action 134 (if any), and a trend in the indoor air quality 114 over time. For instance, if the outdoor air quality 128 is poor, the ventilation action 134 may not be allowed. If a ventilation action 134 is determined to be needed, the ventilation action 134 may be executed by, for example, opening a damper 240 of the ventilation subsystem 148 to allow a diluting flow of air to enter the space (see FIG. 2 and corresponding description below for further details).

The thermostat 106 may provide an alert 136 if an air quality score 118 has been below a threshold (e.g., included in criteria 152) for an extended period of time (Np in Table 2). The alert 136 may indicate that air quality has been continuously poor and/or identify a particular one or more air qualities 114 that are poor. The alert 136 may be provided for display on an endpoint 150 (described below). The thermostat 106 may also determine and store in memory 110 a mitigation and air quality history 140 that is a log of air qualities 114 and air quality score 118 over time along with a record of mitigation actions 130 performed. The mitigation and air quality history 140 may be used to identify faults of the HVAC system 100 resulting in poor indoor air quality. An alert 136 may be automatically provided if the mitigation and air quality history 140 indicates that some alteration or maintenance of the HVAC system 100 is needed to improve air quality (e.g., by changing and/or servicing the air purification subsystem 146 and/or the ventilation subsystem 148).

The thermostat 106 may be in communication with endpoints 150 through wired and/or wireless communication. Example endpoints 150 include a display of the thermostat, a mobile device, a computer associated with a supervisor of the HVAC system 100, and the like. The endpoints may facilitate display of any information received or determined by the thermostat 106, such as, for example, the air quality score 118, any alerts 136, and the mitigation and air quality history 140.

Example HVAC Components

FIG. 2 shows a portion of the example HVAC system 100 of FIG. 1 along with further details of HVAC components 200. The HVAC components 200 are used to condition air for delivery to a space (e.g., all or a portion of a room, a house, an office building, a warehouse, or the like). In some embodiments, the HVAC components 200 are part of a rooftop unit (RTU) that is positioned on the roof of a building, and the conditioned air is delivered to the interior of the building. In other embodiments, portion(s) of the HVAC components 200 may be located within the building and portion(s) outside the building. The HVAC components 200 may include one or more heating elements, not shown for convenience and clarity. The HVAC components 200 may be configured as shown in FIG. 1 or in any other suitable configuration. For example, the HVAC components 200 may include additional components or may omit one or more components shown in FIG. 2.

The HVAC components 200 include a working-fluid conduit subsystem 202, at least one condensing unit 204, an expansion valve 214, an evaporator 216, the blower 228, and a controller 244 coupled to thermostat 106. The working-fluid conduit subsystem 202 facilitates the movement of a working fluid (e.g., a refrigerant) through a cooling cycle such that the working fluid flows as illustrated by the dashed arrows in FIG. 2. The working fluid may be any acceptable working fluid including, but not limited to hydroflurocarbons (e.g., R-410A) or any other suitable type of refrigerant.

The condensing unit 204 includes a compressor 206, a condenser 208, and a fan 210. In some embodiments, the condensing unit 204 is an outdoor unit while other HVAC components 200 may be located indoors. In typical embodiments, the compressor 206 is a variable speed compressor that can be operated at a range of speeds. The compressor 206 is coupled to the working-fluid conduit subsystem 202 and compresses (i.e., increases the pressure of) the working fluid. The compressor 206 is in signal communication with the controller 244 using wired and/or wireless connection. The controller 244 provides commands and/or signals to control operation of the compressor 206 and/or receive signals from the compressor 206 corresponding to a status of the compressor 206.

The condenser 208 is configured to facilitate movement of the working fluid through the working-fluid conduit subsystem 202. The condenser 208 is generally located downstream of the compressor 206 and is configured to remove heat from the working fluid. The fan 210 is configured to move air 212 across the condenser 208. For example, the fan 210 may be configured to blow outside air through the condenser 208 to help cool the working fluid flowing therethrough. The fan 210 may be in communication with the controller 244 (e.g., via wired and/or wireless communication) to receive control signals for turning the fan 210 on and off and/or adjusting a speed of the fan 210. The compressed, cooled working fluid flows from the condenser 208 toward the expansion valve 214.

The expansion valve 214 is coupled to the working-fluid conduit subsystem 202 downstream of the condenser 208 and is configured to remove pressure from the working fluid. In this way, the working fluid is delivered to the evaporator 216. In general, the expansion valve 214 may be a valve such as an expansion valve or a flow control valve (e.g., a thermostatic expansion valve (TXV)) or any other suitable valve for removing pressure from the working fluid while, optionally, providing control of the rate of flow of the working fluid.

The evaporator 216 is generally any heat exchanger configured to provide heat transfer between air flowing through (or across) the evaporator 216 (i.e., airflow 218 contacting an outer surface of one or more coils of the evaporator 216) and working fluid passing through the interior of the evaporator 216. The evaporator 216 may include one or more circuits of coils. The evaporator 216 is fluidically connected to the compressor 206, such that working fluid generally flows from the evaporator 216 to the condensing unit 204 when the HVAC system 100 is operating to provide cooling.

A portion of the HVAC components 200 are configured to move airflow 218 provided by the blower 228 across the evaporator 216 and out of the duct 222 as conditioned airflow 220. Return air 224, which may be air returning from the building, fresh air from outside, or some combination, is pulled into a return duct 226. A suction side of the blower 228 pulls the return air 224. The blower 228 discharges airflow 218 into a duct 230 such that airflow 218 crosses the evaporator 216 or heating elements (not shown) to produce conditioned airflow 220. The blower 228 is any mechanism for providing airflow 218 through the HVAC system 100. For example, the blower 228 may be a constant speed or variable speed circulation blower or fan. Examples of a variable speed blower include, but are not limited to, beltdrive blowers controlled by inverters, direct-drive blowers with electronic commuted motors (ECM), or any other suitable type of blower.

The HVAC components 200 include the air purification subsystem 146 of FIG. 1. The air purification subsystem 146 includes at least a filter 232 and may also include a reactor unit 234. The filter 232 is any appropriate air filter capable of removing particulate matter from return air 224. For example, the filter 232 may be made of fiberglass, cotton, polyester, or any other appropriate material. In some cases, a filter 232 may be rated for the removal of certain sizes of particles from return air 224. The reactor unit 234 is a device capable of removing microorganisms, VOCs, and/or other contaminants from return air 224. For example, the reactor unit 234 may include an ultraviolet light source or ozone source that can remove contaminants from the return air 224.

The HVAC components 200 include the ventilation subsystem 148 of FIG. 1. The ventilation subsystem 148 includes a damper 240 disposed within a duct 238. The duct 238 may be exposed to outdoor air or air from another space for dilution of the space conditioned by the HVAC system 100. When a ventilation action 134 is performed, the damper 240 is opened and the blower 228 (or a separate dedicated blower not shown for conciseness) is turned on to pull a flow of diluting air 236. In some embodiments, the ventilation subsystem 148 includes a preconditioning unit 242, which may pre-cool or pre-heat the diluting air 236, such that the space serviced by the HVAC system 100 is held at a more comfortable temperature.

As described with respect to FIG. 1, the HVAC system 100 includes one or more sensors 104a-c in signal communication with the thermostat 106 (e.g., via wired and/or wireless connection). Sensors 104a-c may be positioned to measure air qualities 114 in the space. In some cases, one or more sensors 104a-c may be positioned in a duct 222, 226, and/or 230 of the HVAC components 200. The thermostat 106 may only rely on measurements from such in-duct sensor 104a-c when the blower 228 is on and has been on a for a sufficient period of time. The HVAC components 200 may include one or more further sensors (not shown for conciseness), such as sensors for measuring temperature, air humidity, and/or any other properties of a conditioned space (e.g., a room of the conditioned space).

The thermostat 106 may be located within the conditioned space (e.g., a room or building) serviced by the HVAC system 100. The controller 244 may be separate from or integrated with the thermostat 106. In addition to the functions described above with respect to FIG. 1, the thermostat 106 is configured to allow a user to input a desired temperature or setpoint temperature for the conditioned space. In some embodiments, the thermostat 106 includes a user interface and display (e.g., an endpoint 150) for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for display of messages related to the status and/or operation of the HVAC system 100 (e.g., an air quality score 118, alert 136, a mitigation action 130 being executed, and/or the mitigation and air quality history 140).

The controller 244 is communicatively coupled (e.g., via wired and/or wireless connection) to the HVAC components 200 and configured to control their operation. The controller 244 generally receives the mitigation action 130 determined by the thermostat 106 (or an electronic signal indicative of the determined mitigation action 130) and provides appropriate control signals 252 to other HVAC components 200 to implement the mitigation action 130. For example, to execute a filtering action 132, the control signals 252 may cause the blower 228 to turn on to pull return air 224 through the air purification subsystem 146. To execute a ventilation action 134, the control signals 252 may cause the damper 240 to at least partially open and the blower 228 to turn on to pull diluting air 236 into the space serviced by the HVAC system 100.

The controller 244 may include a processor 246, memory 248, and input/output (I/O) interface 250. The processor 246 comprises one or more processors operably coupled to the memory 248. The processor 246 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs) that communicatively couples to memory 248 and controls the operation of HVAC system 100. The processor 246 may be a programmable logic device, a microcontroller, a microprocessor, or any suitable combination of the preceding. The processor 246 is communicatively coupled to and in signal communication with the memory 248. The one or more processors are configured to process data and may be implemented in hardware or software. For example, the processor 246 may be 8-bit, 16-bit, 32-bit, 64-bit or of any other suitable architecture. The processor 246 may include an arithmetic logic unit (ALU) for performing arithmetic and logic operations, processor registers that supply operands to the ALU and store the results of ALU operations, and a control unit that fetches instructions from memory 248 and executes them by directing the coordinated operations of the ALU, registers, and other components. The processor may include other hardware and software that operates to process information, control the HVAC system 100, and perform any of the functions described herein (e.g., with respect to FIGS. 1-5B). The processor 246 is not limited to a single processing device and may encompass multiple processing devices.

The memory 248 comprises one or more disks, tape drives, or solid-state drives, and may be used as an over-flow data storage device, to store programs when such programs are selected for execution, and to store instructions and data that are read during program execution. The memory 248 may be volatile or non-volatile and may comprise ROM, RAM, ternary content-addressable memory (TCAM), dynamic random-access memory (DRAM), and static random-access memory (SRAM). The memory 248 is operable to store any suitable set of instructions, logic, rules, and/or code for executing the functions described in this disclosure with respect to FIGS. 1-5B.

The I/O interface 250 is configured to communicate data and signals with other devices. For example, the I/O interface 250 may be configured to communicate electrical signals with the other components of the HVAC systems 100. The I/O interface 250 may send control signals 252 to implement mitigation actions 130 as described above. The I/O interface 250 may use any suitable communication protocol. The I/O interface 250 may comprise ports and/or terminals for establishing signal communications between the controller 244 and other devices. The I/O interface 250 may be configured to enable wired and/or wireless communications.

Connections between various components of the HVAC system 100 and between HVAC components 200 may be wired or wireless. For example, conventional cable and contacts may be used to couple the thermostat 106 to the controller 244 and various components of the HVAC system 100, including, the compressor 206, the expansion valve 214, the blower 228, damper 240, and/or sensor(s) 104a-c. In some embodiments, a wireless connection is employed to provide at least some of the connections between components of the HVAC system 100. In some embodiments, a data bus couples various components of the HVAC system 100 together such that data is communicated there between. In a typical embodiment, the data bus may include, for example, any combination of hardware, software embedded in a computer readable medium, or encoded logic incorporated in hardware or otherwise stored (e.g., firmware) to couple components of HVAC system 100 to each other.

As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 244 to other components of the HVAC system 100.

Example Method of Operation

Figure 3:
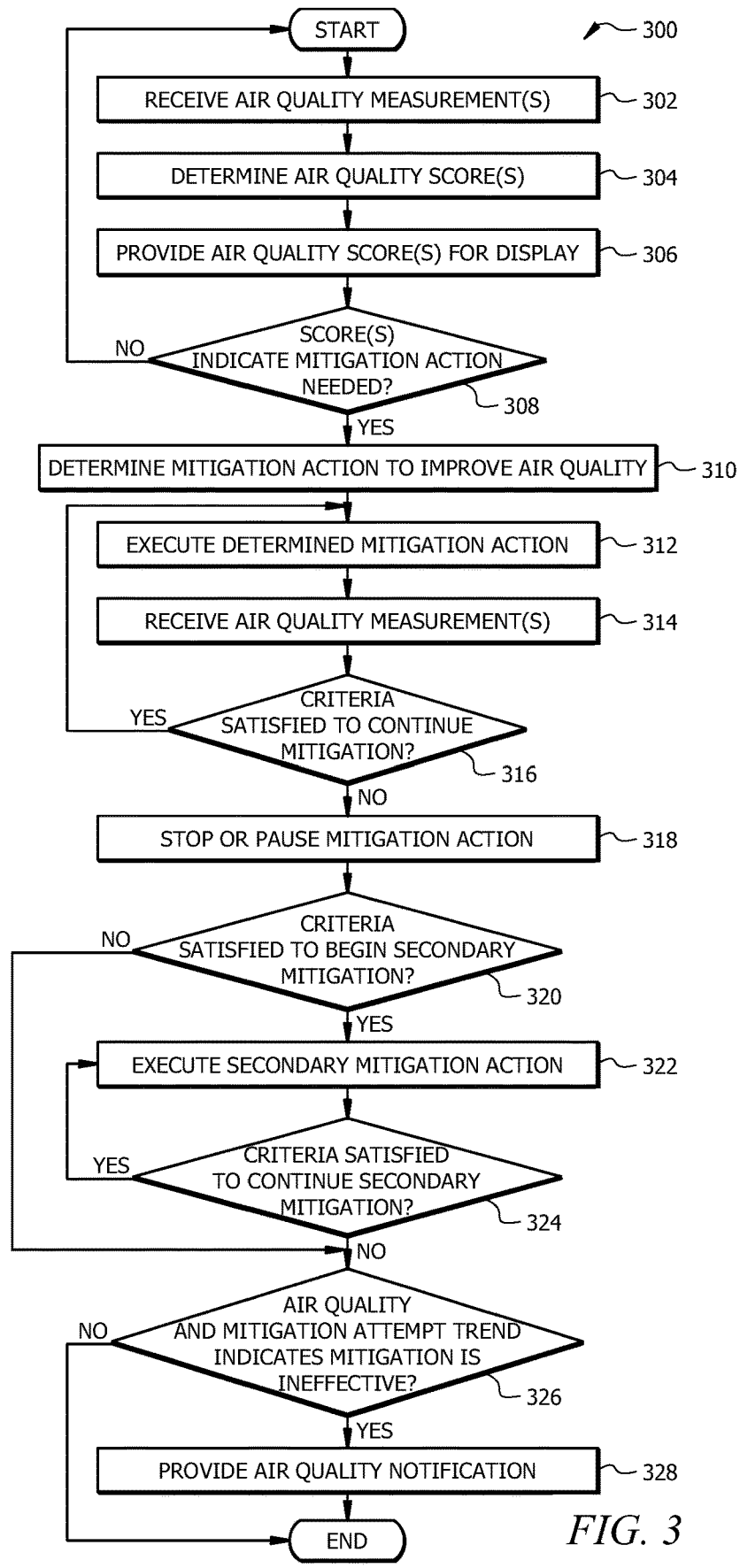
FIG. 3 is a flowchart of an example method of operating the system of FIG. 1.

FIG. 3 is a flowchart of an example method 300 of operating the system of FIG. 1. Operations of method 300 may be implemented using the processor 108, memory 110, and network interface 112 of the thermostat 106. Method 300 may begin at operation 302 where the thermostat 106 receives measurements of indoor air qualities 114. At operation 304, the thermostat 106 determines an indoor air quality score 118, which may include an individual score 122a-c for each air quality 114 measured, as described above with respect to FIG. 1. At operation 306, the air quality score 118 may be provided for display, for example, on an endpoint device 150, as described with respect to FIG. 1 above.

At operation 308, the thermostat 106 determines whether the scores 122a-c from operation 304 indicate that a mitigation action 130 is indicated. For example, if at least one of the scores 122a-c is "poor", a mitigation action 130 may be indicated. If no mitigation action 130 is indicated, the thermostat 106 returns to the start of method 300 and continues receiving measurements of air qualities 114. If the scores 122a-c indicate that a mitigation action 130 is indicated, the thermostat 106 proceeds to operation 310.

At operation 310, the thermostat 106 determines the mitigation action 130 to improve air quality. For example, a mitigation action 130 may be determined that is able to improve any air qualities 114 with a score 122a-c of "poor". For example, if scores 122a-c of "poor" are determined for air qualities 114 of PM and/or VOCs, a filtering action 132 may be identified. A ventilation action 134 may be identified to decrease the concentration of $CO_2$ or if filtering was not effective at removing another contaminant. When possible, a filtering action 132 is typically performed before a ventilation action 134. TABLE 2 above summarizes when example mitigation actions 130 may be determined, and further examples of the determination of a mitigation action 130 are provided below with respect to FIGS. 4, 5A, and 5B.

At operation 312, the determined mitigation action 130 is executed. For example, a filtering action 132 may be executed by turning on the blower 228 of the HVAC system 100 in order to cause air to pass through the air purification subsystem 146. If a ventilation action 134 is determined to be needed, the ventilation action 134 may be executed by, for example, opening a damper 240 of the ventilation subsystem 148 to allow a diluting flow of diluting air 236 to enter the space.

At operation 314, further measurements of air qualities 114 are received. For example, the measurements of air qualities 114 may be received while the mitigation action 130 is occurring (e.g., during a cycle of the mitigation action 130) and/or at or near the end of the mitigation action 130.

At operation 316, the thermostat 106 determines whether criteria 152 are satisfied for continuing the mitigation action 130. For example, the mitigation action 130 may be continued if an air quality 114 still has a score 122a-c of "poor" and if the air quality 114 is improving as a result of the mitigation action 130 executed at operation 312. Other example criteria 152 for continuing or repeating a mitigation action 130 are described further below with respect to FIGS. 4, 5A, and 5B and TABLE 3. If the criteria 152 are satisfied, the thermostat 106 may return to operation 312 and execute the mitigation action 130 again (e.g., execute another cycle of the mitigation action 130) or continue executing the mitigation action 130. Otherwise, the thermostat 106 proceeds to operation 318 and stops or pauses the mitigation action 130.

At operation 320, the thermostat 106 determines whether criteria 152 are satisfied for starting a secondary mitigation action 130. For example, if the mitigation action 130 executed at operation 312 was a filtering action 132 and was stopped or paused at operation 318, the thermostat 106 may determine whether criteria 152 are satisfied for a ventilation action 134 to be performed. For example, if the outdoor air quality 128 is better than "poor", a ventilation action 134 may be allowed. Other example criteria 152 for allowing a ventilation action 134 are described further below with respect to FIGS. 4, 5A, and 5B and TABLE 3. If the criteria 152 are satisfied at operation 320, the thermostat proceeds to operation 322. Otherwise, the thermostat 106 proceeds to operation 326.

At operation 322, the thermostat 106 executes the secondary mitigation action 130 (e.g., the ventilation action 134 in this example). The ventilation action 134 may be executed by at least partially opening the damper 240, as described above with respect to FIGS. 1 and 2. At operation 324, the thermostat 106 determines whether to continue or repeat the secondary mitigation action 130 (see operation 316). For example, if the air qualities 114 are improving after the initial run of the mitigation action 130, then the criteria 152 may be satisfied. Other example criteria 152 for continuing or repeating a mitigation action 130 are described further below with respect to FIGS. 4, 5A, and 5B and TABLE 3.

At operation 326, the thermostat 106 evaluates the mitigation and air quality history 140 to determine whether mitigation actions 130 have been ineffective. For example, if mitigation actions 130 are performed repeatedly without a sufficient improvement in air qualities 114, then the mitigation actions 130 may be determined to be ineffective. If this is the case, the thermostat 106 proceeds to operation 328 and provides a notification (e.g., an alert 136 of FIGS. 1 and 2) indicating that the space has poor air quality and that some system change may be needed to improve the air quality.

Modifications, additions, or omissions may be made to method 300 depicted in FIG. 3. Method 300 may include more, fewer, or other operations. For example, operations may be performed in parallel or in any suitable order. While at times discussed as the thermostat 106 performing the operations, any suitable components (e.g., a controller 244 of FIG. 2) of the HVAC system 100 may perform one or more operations of the method 300.

Example Cycle-Based Method of Operation

Figure 4:
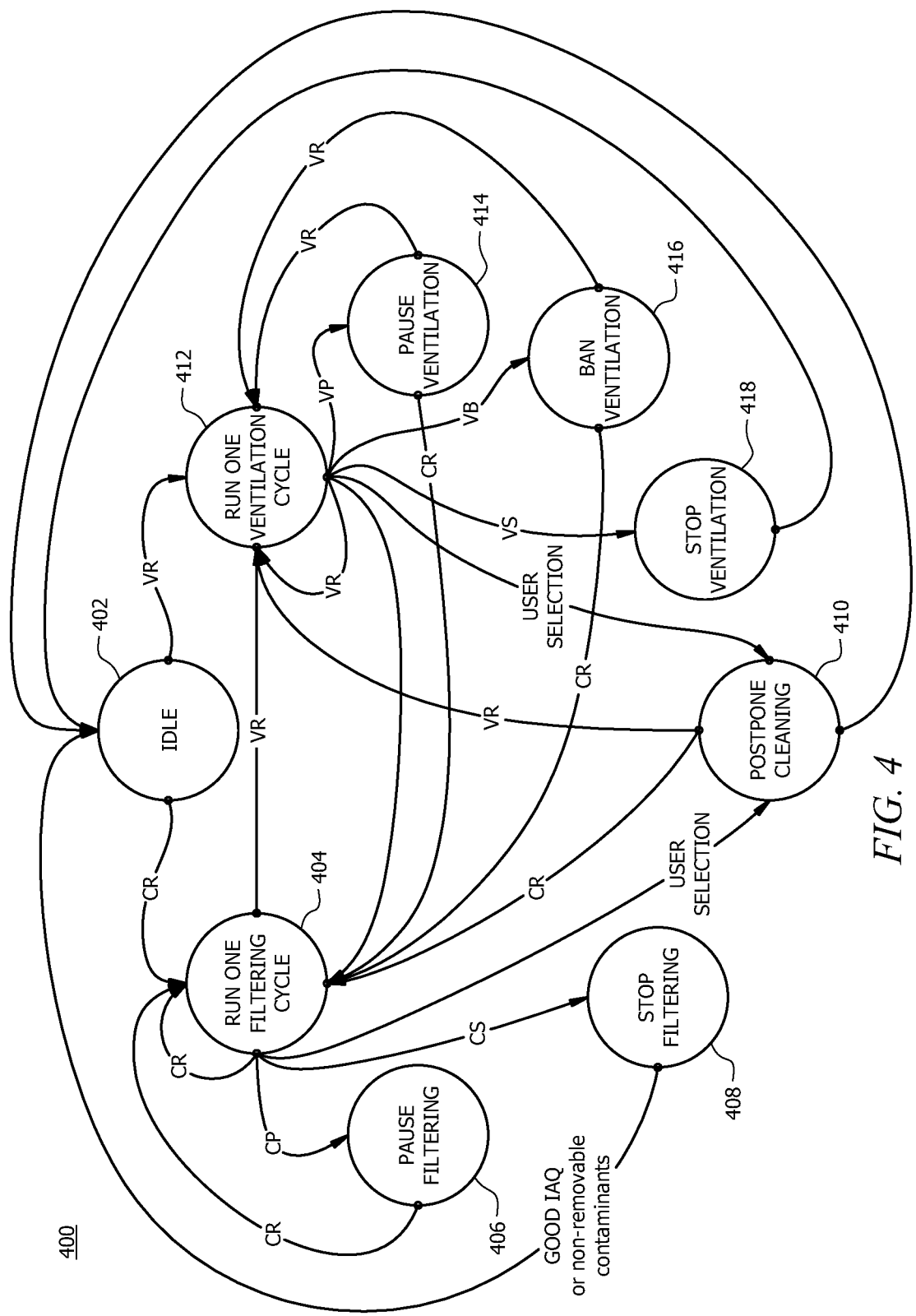
FIG. 4 is a flow diagram illustrating transitions between various operating states of the HVAC system of FIG. 1 for improved air quality mitigation.

In some cases, the HVAC system 100 is operated in a cycle-based fashion, such that mitigation actions 130 may be performed for a predefined time period or cycle (e.g., of 15 minutes or the like) and subsequent mitigation actions 130 (if any) are re-evaluated following or near the completion of each cycle. FIG. 4 shows a state diagram 400 of different example transitions between operating states of the HVAC system 100 for air quality mitigation. In an example, the HVAC system 100 may initially be in an idle state 402 in which no mitigation action 130 is being performed. From the idle state, the thermostat 106 determines whether to enter a "cleaning run" (CR) or "ventilation run" (VR) status. A CR status corresponds to a determination to perform a filtering action 132, and a VR status corresponds to a determination to perform a ventilation action 134.

If there is a CR status, the HVAC system 100 transitions to state 404 and one filtering action 132 cycle is performed. The filtering action 132 may be performed for a time Tc (see TABLE 3 below), during which the blower 228 is run at a predefined airflow rate CFMc (see TABLE 3). After the cycle is completed, the air qualities 114 are re-evaluated (e.g., by performing air quality scoring 116), and the thermostat 106 determines whether to run another cycle of the filtering action 132 (e.g., a CR), pause cleaning by filtration for a predefined period to be re-attempted later (e.g., a cleaning pause or "CP" of FIG. 4), switch to cleaning by ventilation (e.g., a VR), or stop cleaning by filtration (e.g., a cleaning stop or "CS" in FIG. 4).

As an example, a status of CR may be determined if each of the following criteria 152 are satisfied: (1) an active contaminant is present; (2) filtering has not been paused for the active contaminant due to previous unsuccessful filtration attempts; (3) active contaminant cannot be removed by ventilation due to any restrictions on cleaning by ventilation; and (4) either (a) a total number of consecutive filtering cycles has not exceeded Nc_x, defined for the active of the contaminant x, such as $PM_{2.5}$, TVOC, $CO_2$, (see TABLE 3) or (b) the active contaminant is trending down. As shown in FIG. 4, when a CR is identified, the HVAC system 100 changes to (or remains in) state 404.

As another example, a status of CP may be determined if all of the following criteria 152 apply: (1) the active contaminant is either TVOC or $CO_2$; (2) the total number of filtration cycles exceeds Nc_x, defined for the active contaminant x, such as $PM_{2.5}$, TVOC, $CO_2$ (see TABLE 3); and (3) the active contaminant is not trending down. As shown in FIG. 4, when a status of CP is determined, the HVAC system 100 is brought into state 406 and cleaning by filtration is stopped. Cleaning may be stopped for at least Pc_x minutes, defined for the active contaminant x, such as $PM_{2.5}$, TVOC, $CO_2$ (see TABLE 3).

As another example, a status of CS may be determined if an active contaminant is no longer present (e.g., if the air quality scores 118 indicate no mitigation action 130 is needed). As shown in FIG. 4, when a status of CS is determined, the HVAC system 100 is brought into state 408, and the HVAC system 100 may then return to the idle state 402.

If there is a VR status, the HVAC system 100 transitions to state 412 and one cycle of a ventilation action 134 is performed. The ventilation cycle may last Tv minutes (see TABLE 3). After each ventilation cycle, the air qualities 114 and air quality score 118 are re-evaluated to determine whether to run another ventilation cycle (e.g., a VR); pause ventilation for a predefined period (e.g., a ventilation pause or "VP" of FIG. 4) to be reattempted later, temporarily ban ventilation for a predefined period (e.g., a ventilation ban or "VB" of FIG. 4) to be reattempted later, switch to cleaning by filtration (e.g., a CR), or stop cleaning by ventilation (e.g., ventilation stop or "VS" of FIG. 4).

As an example, a VR status may be determined if all of the following criteria 152 apply: (1) an active contaminant is present; (2) a ventilation subsystem 148 is available and is operated by the thermostat 106 and/or controller 244; (3) the user has not opted out of ventilation (e.g., via user override 138 of FIG. 1); (4) cleaning by ventilation has not been paused for the active contaminant due to previous unsuccessful attempts; (5) cleaning by ventilation has not been banned due to poor outside air quality; (6) the outside air quality 128 (if available) is not worse than "Fair"; (7) the active contaminant cannot be removed by a filtering action 132 because of either (a) the absence of a designated air purification subsystem 146 or (b) exceeding a maximum allowed number of consecutive filtration cycles (see Nc_pm, Nc_voc and Nc_co2 of TABLE 3) without improvement in the active contaminant trend; and (8) the total number of consecutive ventilation cycles has not exceeded a predefined value (see Nv_pm, Nv_voc and Nv_co2 of TABLE 3). As shown in FIG. 4, when there is a status of VR, the HVAC system 100 moves to (or remains in) state 412.

As another example, a VB status may be determined when the HVAC system 100 should at least temporarily ban ventilation actions 134. A VB status may be determined if the concentrations of PM and/or VOCs increased (e.g., trended upwards) during a previous ventilation cycle. If a VB status is determined, the HVAC system 100 may be moved to state 416. Ventilation may be banned for Bv minutes (see TABLE 3).

As another example, a VP status may be determined if both: (1) an active contaminant is present and (2) the total number of ventilation cycles exceeded Nv_x defined for the active contaminant x, such as $PM_{2.5}$, TVOC or $CO_2$ (see TABLE 3). If a VP status is determined, the HVAC system moves to state 414 of FIG. 4. Ventilation may be paused for at least Pv_x minutes defined for the active contaminant x, such as $PM_{2.5}$, TVOC or $CO_2$ (see TABLE 3). A VS status may be determined when an active contaminant is no longer present. When a VS status is determined, the HVAC system 100 is moved to state 418 and subsequently back to idle state 402.

In some cases, a user (e.g., a building administrator or an occupant of the space serviced by the HVAC system 100) may be given the option to postpone a mitigation action 130. In such cases, a user override 138 of FIG. 1 may be provided to postpone mitigation and bring the HVAC system 100 to state 410. For example, a current filtering or ventilation cycle of state 404 or 412, respectively, may be postponed for a selected period of time. After this period of time, mitigation may be resumed based on the air qualities 114 at that time.

Certain decisions described above for transitioning between the various states illustrated in FIG. 4 involve evaluation of a trend in an air quality (e.g., a contaminant or measurable air component) over time. These trends may be a score 122a-c indicating whether a level of a given contaminant is increasing, decreasing, or remains about the same. As an example, a trend score tQ_x for a component x being one of $PM_{2.5}$, VOC, or $CO_2$ may be determined as a coefficient using linear regression fitting all available short-term moving averages (STA_x) for that component x over the previous T_tnd minutes when at least M % of STA_x values are available (see TABLES 1 and 3). T_tnd may be either: (1) Tv when ventilation is banned (state 416 of FIG. 4) or (2) 2×Tc for other cases. Example values of Tv and Tc are provided in TABLE 3.

TABLE 3 below shows example parameters, which are described both above with respect to FIG. 4 and below with respect to FIGS. 5A and 5B for performing mitigation cycles to help remove or reduce the amount of the example contaminants of PM, VOCs, and $CO_2$. This disclosure contemplates that similar parameters may be used for the mitigation of other contaminants using the same or similar processes.

TABLE 3

Example Mitigation Configuration Parameters

| Parameter | Purpose | Units | Min | Max | Default |
|---|---|---|---|---|---|
| Tc | run time interval for one filtering cycle | min | 15 | 60 | 15 |
| Tv | run time interval for one ventilation cycle | min | 15 | 45 | 15 |
| CFMc | airflow rate required for cleaning by filtration | CFM | CFM min (Minimum airflow rate for the given HVAC system) | CFM max (Maximum airflow rate for the given HVAC system) | CFM min + (CFM_max − CFM_min)/3 |
| Nc_pm | maximum number of consecutive PM2.5 filtering cycles before mitigation is reevaluated | # | 5 | 50 | 10 |
| Nc_voc | maximum number of consecutive VOC filtering cycles | # | 3 | 50 | 7 without dedicated ventilation subsystem 15 with dedicated air ventilation subsystem |
| Nc_co2 | maximum number of consecutive CO2 filtering cycles | # | 1 | 50 | 2 |
| Nv_pm | max number of consecutive PM2.5 ventilation cycles | # | 3 | 50 | 7 |
| Nv_voc | max number of consecutive VOC ventilation cycles | # | 3 | 50 | 10 |
| Nv_co2 | max number of consecutive $CO_2$ ventilation cycles | # | 2 | 50 | 10 |
| Pc_voc | minimum time interval for which filtering should be paused before being re-attempted | Min | 60 | 300 | 120 |
| Pc_co2 | min time interval for which Co2 filtering should be paused before being re-attempted | Min | 60 | 300 | 120 |
| Pv_pm | min time interval for which PM2.5 ventilation should be paused before being re-attempted | Min | 60 | 300 | 180 |
| Pv_voc | min time interval for which VOC ventilation should be paused before being re-attempted | Min | 60 | 300 | 180 |
| Pv_co2 | min time interval for which CO2 ventilation should be paused before being re-attempted | Min | 60 | 300 | 180 |
| Bv | min time interval for which ventilation should be temporarily banned due to poor outdoor air quality detected | min | 30 | 300 | 60 |
| ITC | max value for improving trend coefficients | # | −0.1 | 0 | −0.05 |
| WTC | min value for worsening trend coefficients | # | 0 | 0.1 | 0.05 |
| M | min % of values available to compute their trending score | % | 30 | 100 | 60 |
| Np | max number of consecutive occurrences LTA score falls in poor range before an alert is raised | # | 1 | 30 | 10 |

Figure 5A:
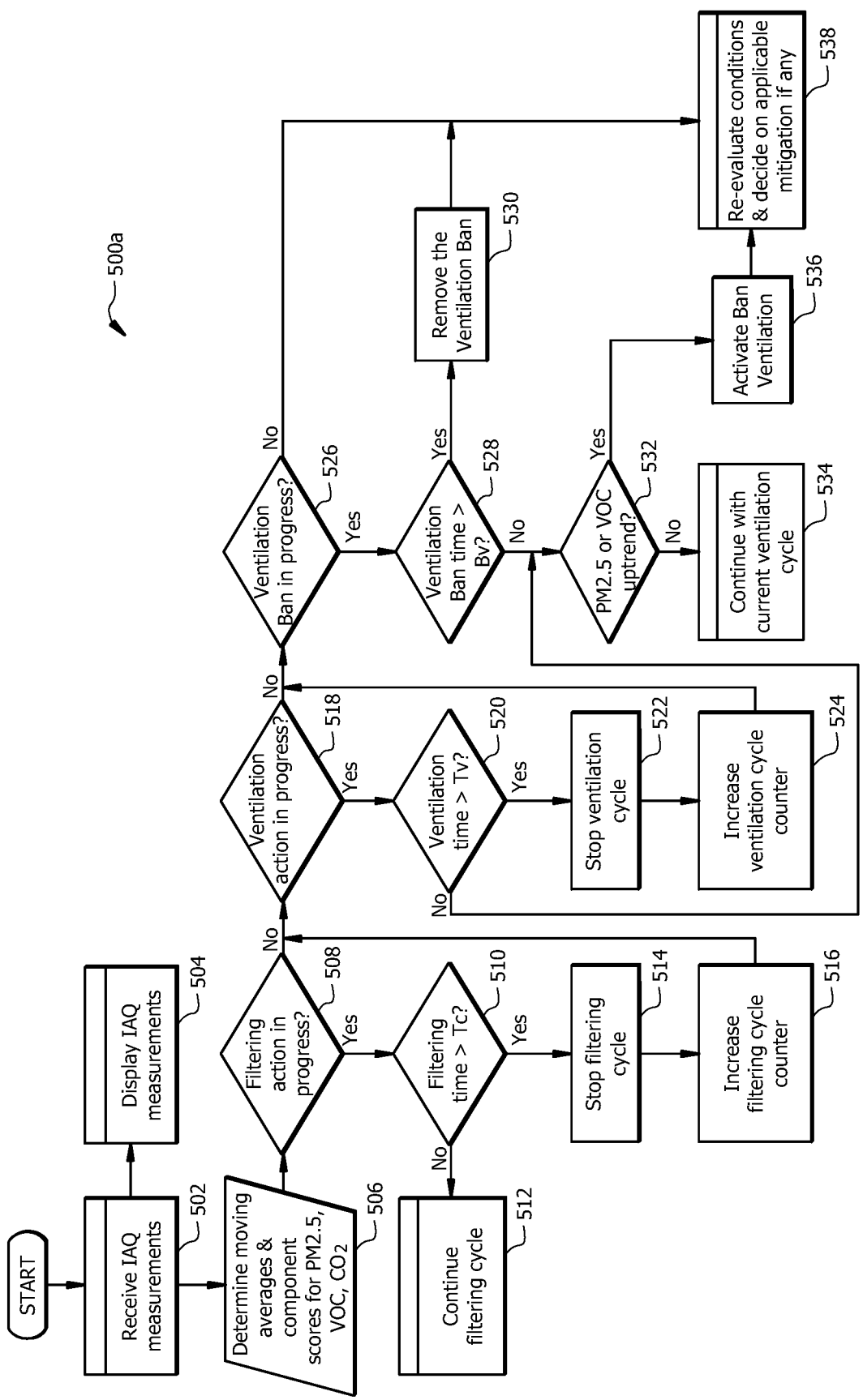
FIGS. 5A and 5B are flowcharts illustrating other example methods of operating the system of FIG. 1.
Figure 5B:
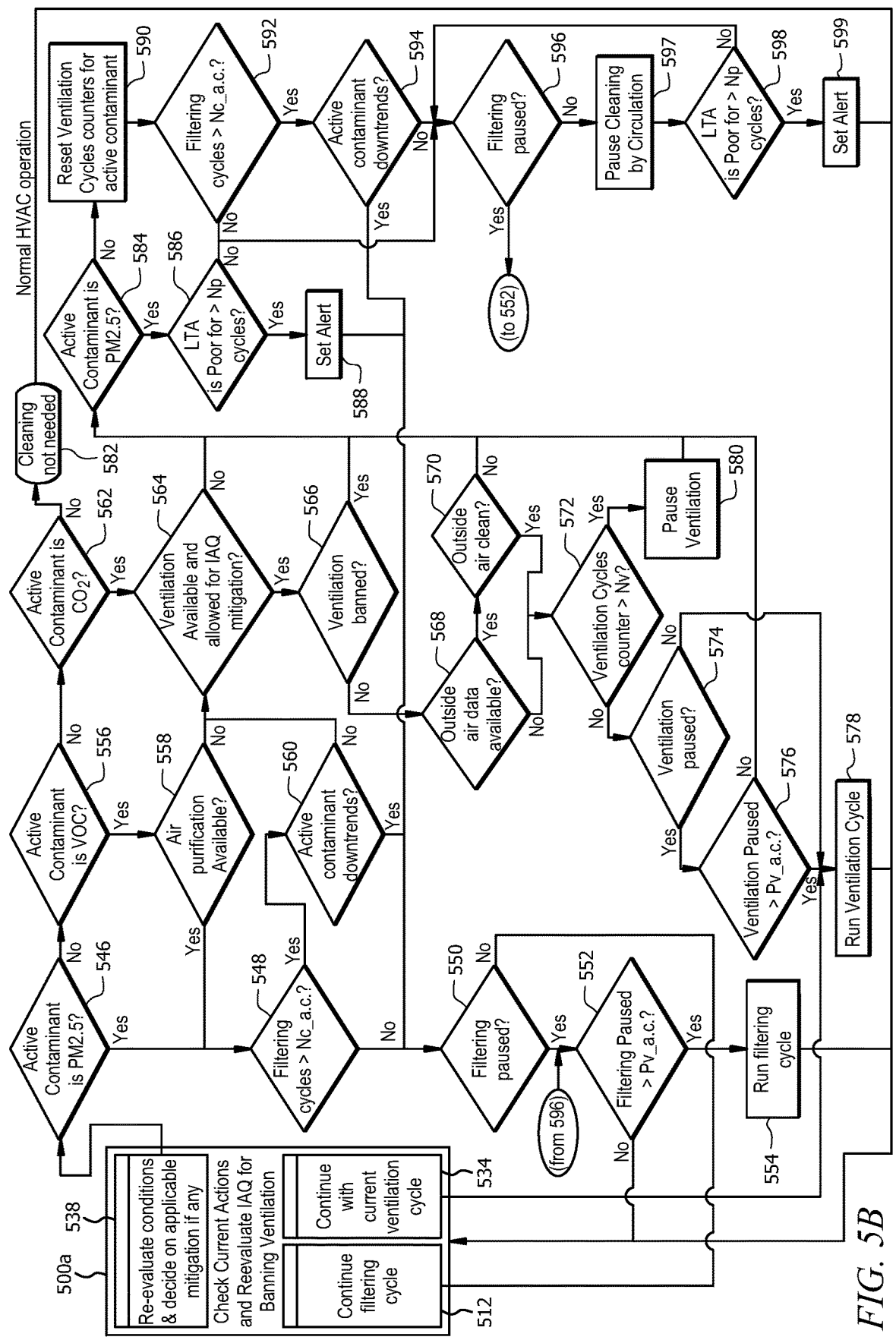

FIGS. 5A and 5B illustrate processes 500a b for operating the HVAC system 100 using cycle-based air quality mitigation. The example processes 500a,b are performed to mitigate the contaminants of PM (specifically PM2.5 in the examples of FIGS. 5A and 51B), VOCs, and $CO_2$. FIG. 5A illustrates an initial process 500a for operating the HVAC system 100. Process 500a begins at operation 502 where measurements of indoor air qualities 114 (referred to as "IAQ" in FIGS. 5A and 5B) are received by the thermostat 106. The air qualities 114 are concentrations of PM2.5, VOCs, and $CO_2$. At operation 504, the measurements of one or more of these air qualities 114 may be displayed on an endpoint device 150, as described with respect to FIG. 1 above.

At operation 506, moving averages 120a-c and corresponding scores 122a-c are determined for the different monitored contaminants. At operation 508, the thermostat 106 determines whether a filtering action is already in progress. If this is the case, the thermostat 106 proceeds to operation 510. Otherwise, the thermostat 106 moves to operation 518.

At operation 510, the thermostat 106 determines whether the filtering time has exceeded a maximum value Tc (see TABLE 3 above). If this is not the case, the thermostat 106 allows the filtering action 132 to continue. Otherwise, the thermostat 106 proceeds to stop the filtering action 132 at operation 514. At operation 516, the thermostat 106 increases a count of the number of filtering actions 132 performed for the active contaminant.

At operation 516, the thermostat 106 determines whether a ventilation action 134 is in progress. If this is the case, thermostat 106 proceeds to operation 520. Otherwise, the thermostat 106 moves to operation 526. At operation 520, the thermostat 106 determines whether the ventilation time has exceeded a maximum value Tv (see TABLE 3 above). If this is not the case, the thermostat 106 proceeds to operation 532. Otherwise, the thermostat 106 proceeds to stop the ventilation action 134 at operation 522. At operation 524, the thermostat 106 increases a count of the number of ventilation actions 134 performed for the active contaminant.

At operation 526, the thermostat 106 determines whether there is a ventilation ban in progress (see, e.g., state 416 of FIG. 4). If this is not the case, the thermostat proceeds to operation 538. Otherwise, the thermostat 106 proceeds to operation 528 and determines whether the ventilation ban has exceeded a ban time limit By (see TABLE 3 above). If this time limit is exceeded, the thermostat 106 proceeds to operation 530 and removes the ventilation ban.

At operation 532, the thermostat 106 determines whether there is an upward trend over time in the concentration of PM2.5 and/or VOC. If this is not the case, the current ventilation action 134 is allowed to continue at operation 534. However, if this is the case, a ventilation ban is activated at operation 536. At operation 538, air qualities 114 are evaluated (e.g., as described for operation 506), and a mitigation action 130 is determined as described above with respect to FIG. 1.

FIG. 5B shows a subsequent process 500b for implementing the mitigation action 130 determined at operation 538 based on the type of active contaminant. Process 500b is linked to operations of process 500a as illustrated in FIG. 5B. At operation 546 of process 500b, the thermostat 106 determines if the active contaminant is PM2.5. If this is the case, the thermostat 106 proceeds to operation 548. Otherwise, the thermostat 106 proceeds to operation 556.

At operation 548, the thermostat 106 determines whether the number of filtering cycles for the active contaminant (abbreviated as "a.c." in FIG. 5B) exceeds a threshold value (see Nc_pm, Nc_voc, Nc_co2 of TABLE 3 above). If the threshold is not exceeded, the thermostat 106 proceeds to operation 550. If the threshold is exceeded, the thermostat 106 proceeds to operation 560.

At operation 550, the thermostat 106 determines whether filtering is paused. If filtering is not paused, the thermostat 106 continues the filtering action 132 at operation 512 of process 500a. However, if filtering is paused, the thermostat 106 determines whether filtering has been paused for greater than a threshold time (see Pc_pm, Pc_voc, Pc_co2 of TABLE 3 above). If this is not the case, the thermostat 106 returns to the start of process 500a. However, if this is the case, the thermostat 106 runs a cycle of the filtering action 132 at operation 554 before returning to process 500a.

At operation 560 (if the maximum number of filtering cycles is exceeded at operation 548), the thermostat 106 determines whether there is a downward trend in the concentration of the active contaminant PM2.5. If this is the case, the thermostat 106 proceeds to operation 550 described above. If this is not the case, the thermostat 106 proceeds to operation 564 and determines whether ventilation is available (e.g., whether the HVAC system 100 includes a ventilation subsystem 148—see FIGS. 1 and 2).

At operation 556 (if PM2.5 is not the active contaminant at operation 546), the thermostat 106 determines whether VOC is the active contaminant. If VOC is the active contaminant, the thermostat 106 proceeds to operation 558 and determines whether air purification is available. Air purification is determined to be available if the HVAC system 100 includes an air purification subsystem 146 with a reactor unit 234 capable of removing VOCs (see FIGS. 1 and 2 and their corresponding descriptions above). If air purification is available, the thermostat 106 proceeds to operation 548 described above. If air purification is not available, the thermostat 106 proceeds to operation 564 and determines whether ventilation is available.

At operation 526 (if VOC is not the active contaminant at operation 556), the thermostat 106 determines whether the active contaminant is $CO_2$. If $CO_2$ is also not the active contaminant, the thermostat 106 determines no cleaning is needed at operation 582 and returns to normal operation and process 500a. However, if $CO_2$ is the active contaminant, the thermostat 106 proceeds to operation 564 and determines whether ventilation is available. If ventilation is not available, the thermostat 106 proceeds to operation 584 described below. If ventilation is available, the thermostat 106 proceeds to operation 566 and determines whether ventilation is banned. If ventilation is banned, the thermostat 106 proceeds to operation 584. If ventilation is not banned, the thermostat 106 proceeds to operation 568 and determines whether an outdoor air quality 128 is available. If the outdoor air quality 128 is not available, the thermostat 106 proceeds to operation 572. However, if the outdoor air quality 128 is available, the thermostat 106 proceeds to operation 570 and determines whether the outdoor air is sufficiently clean based on the outdoor air quality 128 (e.g., whether a score for the outdoor air is better than "poor"). If the outdoor air is not sufficiently clean, the thermostat 106 proceeds to operation 584. Otherwise, the thermostat 106 proceeds to operation 572.

At operation 572, the thermostat 106 determines whether the number of ventilation cycles performed exceeds a threshold (see Nv_pm, Nv_voc, Nv_co2 of TABLE 3 above). If the threshold is not exceeded, the thermostat 106 proceeds to operation 574 and determines whether ventilation is paused. If ventilation is not paused, the thermostat 106 proceeds to operation 578 and runs a cycle of a ventilation action 134. If ventilation is paused, the thermostat 106 proceeds to operation 576 and determines whether a maximum ventilation pause time for the active contaminant (see Pv_pm, Pv_voc, Pv_co2 of TABLE 3 above) has been exceeded. If the maximum ventilation pause time is not reached, the thermostat 106 proceeds to operation 584. Otherwise, the thermostat 106 runs a cycle of the ventilation action 134 at operation 578.

At operation 584 (if ventilation is not available at operation 564, ventilation is banned at operation 566, outdoor air is not clean at operation 570, ventilation is paused at operation 580, or the maximum ventilation pause time has not been reached at operation 576), the thermostat 106 determines if the active contaminant is PM2.5. If this is the case, the thermostat 106 proceeds to operation 586 and determines if the score 122a-c based on the long-term average (LTA for the active contaminant) has been poor for longer than a threshold number of cycles Np (see TABLE 3 above). If this is not the case, the thermostat 106 proceeds to operation 596. Otherwise, the thermostat 106 proceeds to operation 588 and sets or provides an alert 136 indicating a persistently high concentration of PM2.5 in the indoor space that could not be addressed by the previous cleaning attempts before moving to operation 550, described above.

If the active contaminant is not PM2.5 at operation 584, the thermostat 106 proceeds to operation 590 and reset the ventilation cycle counter for the active contaminant. At operation 592, the thermostat 106 then determines if the number of filtering cycles performed exceeds a threshold value (see operation 548). If this is the case, the thermostat 106 proceeds to operation 594 and determines if there is a downwards trend in the concentration of the active contaminant (see operation 560). If there is a downward trend, the thermostat 106 proceeds to operation 550. Otherwise, the thermostat 106 proceeds to operation 596. If the number of filtering cycles is not greater than the threshold at operation 592, the thermostat 106 also proceeds to operation 596.

At operation 596, the thermostat 106 determines whether filtering is paused (see operation 550). If filtering is paused, the thermostat 106 proceeds to operation 552. Otherwise, the thermostat 106 proceeds to operation 597. At operation 597, the thermostat 106 pauses the filtering action 132. At operation 598, the thermostat 106 determines if the score 122a-c based on the long-term average (LTA for the active contaminant) has been poor for longer than a threshold number of cycles Np (see TABLE 3 above). If this is not the case, the thermostat 106 returns to operation 596. Otherwise, the thermostat 106 proceeds to operation 599 and sets or provides an alert 136 for persistently poor indoor air quality.

Modifications, additions, or omissions may be made to processes 500a,b depicted in FIGS. 5A and 5B. Processes 500a,b may include more, fewer, or other operations. For example, operations may be performed in parallel or in any suitable order. While at times discussed as the thermostat 106 performing the operations, any suitable components (e.g., a controller 244 of FIG. 2) of the HVAC system 100 may perform one or more operations of the processes 500a,b.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 212(f) as it exists on the date of filing hereof unless the words "means for" or "step for" are explicitly used in the particular claim.

What is claimed is:

1. A heating, ventilation, and air conditioning (HVAC) system configured to provide conditioned air to a space, the HVAC system comprising:
   one or more air quality sensors, each air quality sensor configured to measure an air quality; and
   a thermostat comprising:
      an interface communicatively coupled to the one or more air quality sensors; and
      a processor configured to:
         receive indoor air quality measurements from the one or more air quality sensors;
         determine an indoor air quality score based at least in part on the received indoor air quality measurements;
         determine, based at least in part on the indoor air quality score, a mitigation action, wherein the mitigation action comprises: (i) a filtering action comprising filtering air provided to the space using an air purification subsystem, and/or (ii) a ventilation action comprising ventilating the space using a ventilation subsystem;
         determine that the mitigation action comprises at least the filtering action by determining that a current indoor air quality is below a quality threshold and that a number of previous attempts to perform the filtering action do not exceed a maximum threshold; and
         execute the filtering action by performing a filtering cycle using the air purification subsystem.

2. The HVAC system of claim 1, wherein the processor is further configured to, after completion of the filtering cycle:
   if the indoor air quality measurements received after the filtering cycle is complete satisfy second criteria associated with one or more of a type of contaminant needing to be removed, a number of previous attempts to perform the filtering action, and a trend in the indoor air quality over time, pause execution of the filtering action and determine whether a ventilation cycle is allowed; and
   if the indoor air quality measurements received after the filtering cycle is complete indicates mitigation is no longer needed, stop the filtering action.

3. The HVAC system of claim 2, wherein the processor is further configured to:
   determine that the ventilation cycle is allowed by determining whether third criteria are satisfied associated with one or more of an outdoor air quality, a number of previous attempts to perform the ventilation action, and a trend in the indoor air quality over time; and
   after determining that the ventilation cycle is allowed, execute the ventilation cycle by opening a damper of the ventilation subsystem of the HVAC system to allow a diluting flow of air to enter the space.

4. The HVAC system of claim 1, wherein the processor is further configured to:
   determine that an outdoor air quality is below a quality threshold; and
   in response to determining that the outdoor air quality is below the quality threshold, prevent execution of the ventilation action.

5. The HVAC system of claim 1, wherein the processor is further configured to:
   execute the filtering action by turning on a blower that provides a flow of the air across the air purification subsystem; and
   execute the ventilation action by opening a damper in the ventilation subsystem of the HVAC system to allow a diluting flow of air to enter the space.

6. The HVAC system of claim 1, wherein the processor is further configured to determine the indoor air quality score by:
   determining a moving average of the indoor air quality over time; and
   determining the indoor air quality score by comparing the moving average to a predefined threshold.

7. The HVAC system of claim 1, wherein the processor is further configured to:
   determine that the one or more air quality sensors are located within a duct of the HVAC system;
   determine that an indoor air quality measurement is needed; and
   activate a blower of the HVAC system to provide a flow of air past the one or more air quality sensors located within the duct prior to measuring the indoor air quality.

8. The HVAC system of claim 1, wherein the indoor air quality comprises one or more of a concentration of particles in air, a concentration of volatile organic compounds in air, or a concentration of carbon dioxide in air.

9. A method of operating a heating, ventilation, and air conditioning (HVAC) system configured to provide conditioned air to a space, the method comprising:
   measuring an air quality using one or more air quality sensors; and
   receiving indoor air quality measurements from the one or more air quality sensors located within the space;
   determining an indoor air quality score based at least in part on the received indoor air quality measurements;
   determining, based at least in part on the indoor air quality score, a mitigation action, wherein the mitigation action comprises: (i) a filtering action comprising filtering air provided to the space using an air purification subsystem, and/or (ii) a ventilation action comprising ventilating the space using a ventilation subsystem;
   determining that the mitigation action comprises at least the filtering action by determining that a current indoor air quality is below a quality threshold and that a number of previous attempts to perform the filtering action do not exceed a maximum threshold; and
   executing the filtering action by performing a filtering cycle using the air purification subsystem.

10. The method of claim 9, further comprising, after completion of the filtering cycle:
    if the indoor air quality measurements received after the filtering cycle is complete satisfy second criteria associated with one or more of a type of contaminant needing to be removed, a number of previous attempts to perform the filtering action, and a trend in the indoor air quality over time, pausing execution of the filtering action and determining whether a ventilation cycle is allowed; and
    if the indoor air quality measurements received after the filtering cycle is complete indicates mitigation is no longer needed, stopping the filtering action.

11. The method of claim 10, further comprising
    determining that the ventilation cycle is allowed by determining whether third criteria are satisfied associated with one or more of an outdoor air quality, a number of previous attempts to perform the ventilation action, and a trend in the indoor air quality over time; and
    after determining that the ventilation cycle is allowed, executing the ventilation cycle by opening a damper of a ventilation subsystem of the HVAC system to allow a diluting flow of air to enter the space.

12. The method of claim 9, further comprising:
    determining that an outdoor air quality is below a quality threshold; and
    in response to determining that the outdoor air quality is below the quality threshold, preventing execution of the ventilation action.

13. The method of claim 9, further comprising:
    executing the filtering action by turning on a blower that provides a flow of the air across the air purification subsystem; and
    executing the ventilation action by opening a damper in the ventilation subsystem of the HVAC system to allow a diluting flow of air to enter the space.

14. The HVAC method of claim 9, further comprising determining the indoor air quality score by:
    determining a moving average of the indoor air quality over time; and
    determining the indoor air quality score by comparing the moving average to a predefined threshold.

15. The method of claim 9, further comprising:
    determining that the one or more air quality sensors are located within a duct of the HVAC system;
    determining that an indoor air quality measurement is needed; and
    activating a blower of the HVAC system to provide a flow of air past the one or more air quality sensors located within the duct prior to measuring the indoor air quality.

16. The method of claim 9, wherein the indoor air quality comprises one or more of a concentration of particles in air, a concentration of volatile organic compounds in air, or a concentration of carbon dioxide in air.

17. A thermostat of a heating, ventilation, and air conditioning (HVAC) system configured to provide conditioned air to a space, the thermostat comprising:
    an interface communicatively coupled to one or more air quality sensors, each air quality sensor configured to measure an air quality; and
    a processor configured to:
    receive indoor air quality measurements from the one or more air quality sensors;

determine an indoor air quality score based at least in part on the received indoor air quality measurements;

determine, based at least in part on the indoor air quality score, a mitigation action, wherein the mitigation action comprises: (i) a filtering action comprising filtering air provided to the space using an air purification subsystem, and/or (ii) a ventilation action comprising ventilating the space using a ventilation subsystem;

determine that the mitigation action comprises at least the filtering action by determining that a current indoor air quality is below a quality threshold and that a number of previous attempts to perform the filtering action do not exceed a maximum threshold; and execute the filtering action by performing a filtering cycle using the air purification subsystem.

* * * * *